A. E. DAVIS.
VAULT LIGHT.
APPLICATION FILED SEPT. 13, 1916.

1,245,199.

Patented Nov. 6, 1917.
2 SHEETS—SHEET 1.

WITNESS:
Rob'k R Kitchel.

INVENTOR
Anthony Elton Davis
BY
Augustus B. Stoughton.
ATTORNEY.

A. E. DAVIS.
VAULT LIGHT.
APPLICATION FILED SEPT. 13, 1916.

1,245,199.

Patented Nov. 6, 1917.
2 SHEETS—SHEET 2.

WITNESS:
Rob R Kitchel

INVENTOR
Anthony Elton Davis
BY
Augustus B. Stoughton,
ATTORNEY.

UNITED STATES PATENT OFFICE.

ANTHONY ELTON DAVIS, OF PHILADELPHIA, PENNSYLVANIA.

VAULT-LIGHT.

1,245,199.      Specification of Letters Patent.      Patented Nov. 6, 1917.

Application filed September 13, 1916. Serial No. 119,831.

*To all whom it may concern:*

Be it known that I, ANTHONY ELTON DAVIS, a citizen of the United States, residing at Philadelphia, in the county of Philadelphia and State of Pennsylvania, have invented certain new and useful Improvements in Vault-Lights, of which the following is a specification.

The principal objects of the present invention are, first, to provide for renewing worn or broken vault-light glasses in such a way that they are, both before and after the renewal, mounted or set and held in place in and by concrete forming part of the structure, and second, to provide for the convenient and satisfactory renewal of such glasses. The invention will be claimed at the end hereof but other of its objects will appear from the following description which will be given in connection with the accompanying drawings forming part hereof and in which Figure 1, is a top or plan view of one form of one of the mate glasses intended for original installation.

Fig. 2, is a side view of the same, showing, partly in section, accessories hereinafter referred to.

Figure 3:
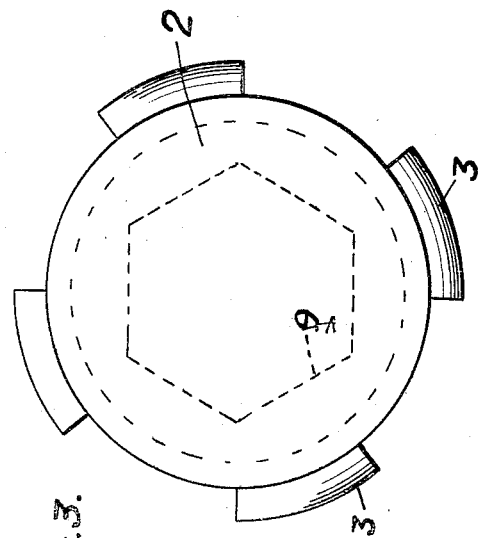
Figs. 3 and 4, are respectively top and side views of one form of the other mate glasses, intended for renewal or repair use.
Figure 4:
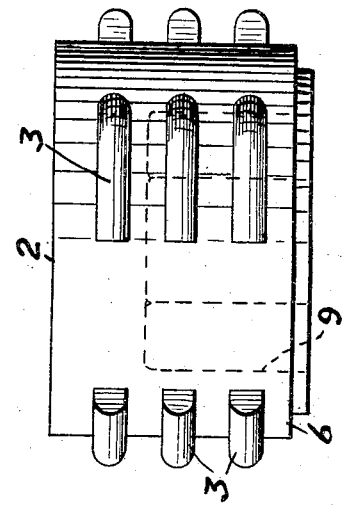
Figure 1:
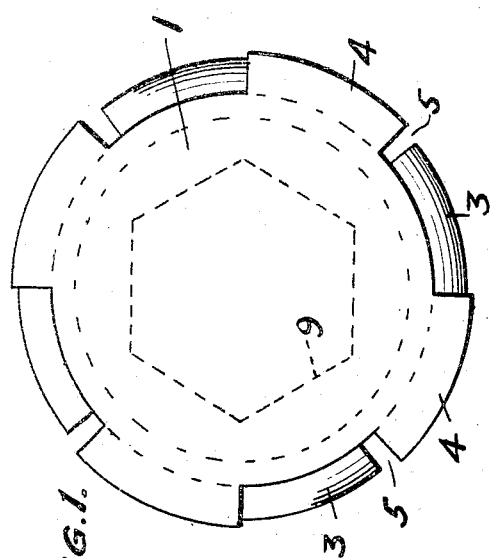
Figure 2:
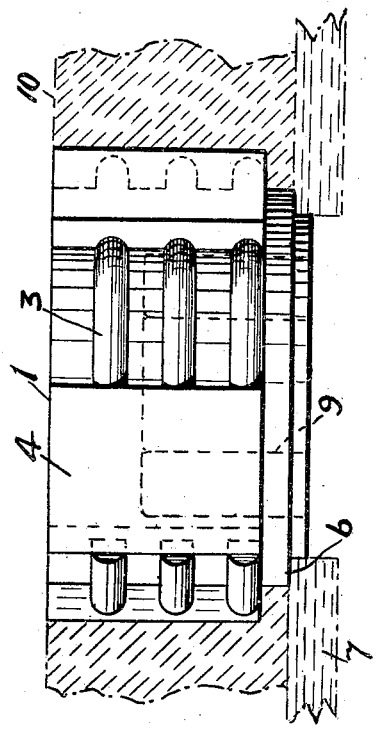
Figure 7:
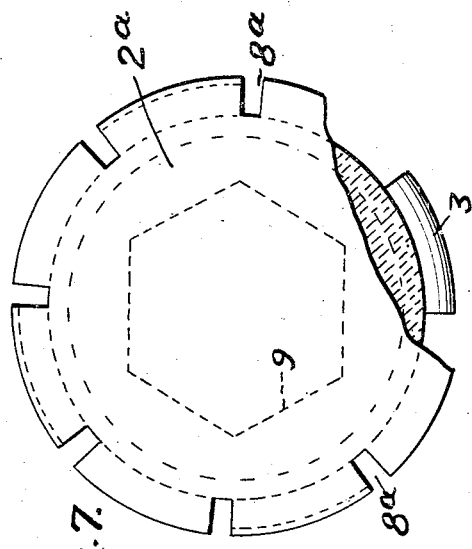
Figure 8:
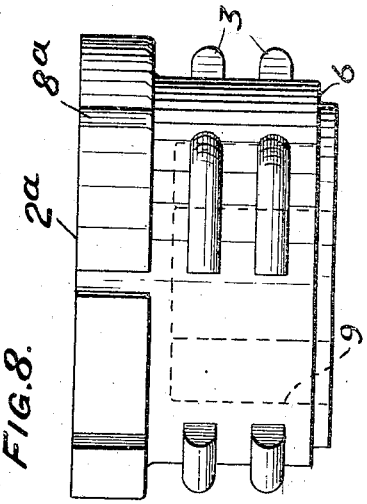
Figure 5:
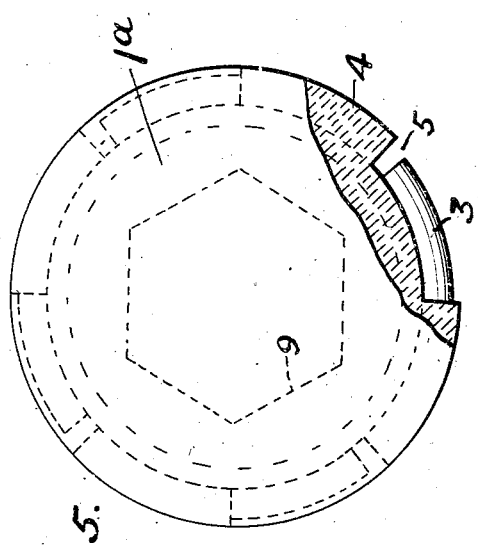
Fig. 5, is a top view with parts broken away, of another form of one of the mate glasses, intended for original installation.
Figure 6:
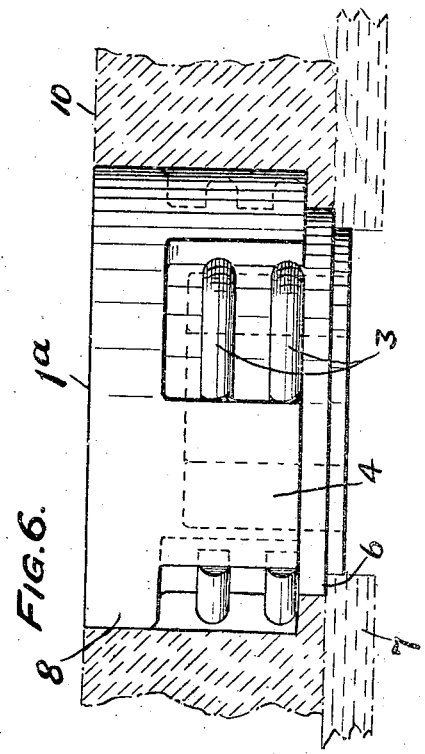
Fig. 6, is a view similar to Fig. 2, but showing the form of glass illustrated in Fig. 5, and Figs. 7 and 8, are respectively a top view with parts broken away and a side view of another form of the other mate glass, intended for renewal or repair of the glass shown in Fig. 5.

In the drawings 1 and 2, Figs. 1–4, and 1ª and 2ª, Figs. 5–8, are mate glasses, provided with duplicate circumferential locking ribs or wings 3, extending part way around them, and whereof one, 1 or 1ª, intended for original use, is provided between the ribs 3, with cylindrical relief portions 4, adapted to provide openings in the matrix formed in the concrete, and whereof the other 2 or 2ª, intended for replacing the first, is devoid of such relief portions whereby its ribs may make a bayonet-joint connection with said matrix leaving said openings exposed for the reception of concrete. Spaces 5, are shown between the ribs 3, and relief portions 4, and when present, they allow concrete to enter between the ribs and relief portions and this concrete forms stops for the replacement glasses. 6, are a pair of shoulders formed on the glasses and one of them is useful for supporting the glass upon the falsework or removable support 7, during the original installation, and the other shoulder is useful in positioning the glass in the matrix in the concrete during repairs or renewals. The number of ribs or wings 3, in a set may vary; in Figs. 1–4, there are shown three parallel ribs in each set, whereas in Figs. 5–8, there are shown two ribs in each set, so that wide latitude is permitted in regard to these matters. In Figs. 5–8, the glass is shown as provided with an enlarged head 8, which is continuous in Figs. 5 and 6, but notched as at 8ª, in Figs. 7 and 8, for the passage of concrete. This head has the advantage of adding strength and producing less contrast between the glasses when set in the construction than is produced by the glasses shown in Figs. 1–4. Each glass is shown as provided with a squared socket 9, useful in the case of glasses, intended for renewals or repairs, in turning them into the matrices or bayonet-joint members formed in the concrete.

In use the glasses 1 or 1ª, are set in concrete 10, and are held therein by their described configuration. They produce in the concrete matrices, which are in form, members of bayonet joints, so that when they are removed by reason of wear or breakage, such matrices are left in the concrete. The coating, as of asphaltic material, which is usually applied to the glasses, facilitates their removal by breaking them into pieces without damaging the matrices. The relief portions 4, provide openings in the matrices which receive the ribs 3, on the renewal or repair glass 2 or 2ª, so that the latter can be inserted into the matrices and then turned to bring the ribs 3, into the grooves previously formed in the concrete by the ribs on the original glasses. These openings also serve to receive fresh concrete after the repair or replacement glass has been turned in place in the matrix, and this additional concrete locks the glass in position. Evidently the repairs are easily and quickly made and in both the original and renewal constructions the glasses are set and held in concrete. If desired, renewal glasses of different thicknesses may be provided so that by selection they may be made to conform to the general level or surface of the structure even though the latter may have been worn.

Obviously changes may be made in details of construction and arrangement without departing from the spirit of the invention, hence the latter is not limited in regard to such matters or otherwise than as the prior art and the following claims may require.

What I claim is:

1. For replaceable concrete vault-light constructions, glasses of the form of the same member of a bayonet joint and whereof those intended for original use are provided with relief portions adapted to provide openings in the matrices formed in the concrete by the original glasses, and whereof those intended for replacement are devoid of such relief portions and are adapted for application to the matrices, substantially as described.

2. For replaceable concrete vault-light construction mate glasses provided with duplicate circumferential locking ribs extending partway around them and whereof one, intended for original use, is provided between the ribs with cylindrical relief portions adapted to provide openings in the matrix formed in the concrete and whereof the other, intended for replacing the first, is devoid of such relief portions, whereby its ribs may make a bayonet-joint with said matrix leaving said openings exposed for the reception of concrete, substantially as described.

3. For replaceable concrete vault-light construction an original glass provided with circumferential ribs extending partway around it and with cylindrical relief portions arranged between said ribs and spaced from them and adapted to form in the concrete a member of a bayonet-joint.

4. For replaceable concrete vault-light construction an original glass provided with circumferential ribs extending partway around it and with cylindrical relief portions arranged between said ribs and adapted to form in the concrete a member of a bayonet-joint.

5. For replaceable concrete vault-light construction a renewal glass adapted to replace an original glass and having circumferential ribs extending partway around it with spaces between the ribs and forming a member of a bayonet-joint adapted to be locked in place by the application of concrete in said spaces.

6. For replaceable concrete vault-light construction an original glass having an enlarged head and provided beneath said head with circumferential ribs extending partway around it and with cylindrical relief portions arranged between said ribs and adapted to form in concrete a member of a bayonet-joint, substantially as described.

7. For replaceable concrete vault-light construction, a renewal glass adapted to replace an original glass and provided with an enlarged notched head and having circumferential ribs extending partway around it with spaces between the ribs and forming a member of a bayonet-joint adapted to be locked in place by the application of concrete through said notches with said spaces.

8. For replaceable concrete vault-light constructions, glasses having enlarged heads and of the form of the same member of a bayonet joint and whereof those intended for original use are provided with relief portions adapted to provide openings in the matrices formed in the concrete by the original glasses and whereof those intended for replacement are devoid of such relief portions and are adapted for application to the matrices, substantially as described.

ANTHONY ELTON DAVIS.

Copies of this patent may be obtained for five cents each, by addressing the "Commissioner of Patents, Washington, D. C."